INVENTOR
JOHN V. HENDRICK.
ATTORNEYS

Patented May 23, 1939

2,159,327

UNITED STATES PATENT OFFICE 2,159,327

BEARING

John V. Hendrick, Detroit, Mich., assignor to Chrysler Corporation, Highland Park, Mich., a corporation of Delaware Application March 8, 1937, Serial No. 129,662

4 Claims. (Cl. 308—240)

This invention relates to improved bearings.

In many bearing applications, it has been found to be desirable to yieldably mount the bearing part, which includes the bearing surface, in order to accommodate self-aligning of the bearing and to permit relatively large tolerance limits. Additional advantages are obtained when non-metallic sound insulating material, such as rubber, is employed to facilitate the yielding action. Many materials of this character, particularly rubber, are susceptible to deterioration and destruction by the lubricants with which bearing surfaces are provided, and their use for such purposes is therefore limited.

These difficulties can be overcome by employing as bearing material a porous metal structure which has a substantial lubricant absorbing capacity and which enables the supplying of lubricant to its bearing surface in sufficient quantities while holding the lubricant against flowing onto the surfaces of the associated parts of the bearing mounting. A bearing element of this kind can be successfully yieldably mounted in rubber by interposing between the bearing element and rubber part a layer, preferably comprising sheet metal to which rubber readily bonds during vulcanization and to which the bearing element can be surface bonded in lubricant sealing relation with respect to the surface of the bearing element adjacent the rubber part.

One of the main objects of the invention is the provision of an integrally united bearing element and yieldable mounting in which the material of the mounting is protected from detrimental action of the lubricant used on the bearing.

Another object of the invention is the provision in a bearing member of this character, of bearing material which has a relatively large self-contained lubricant content and which will not release excessive quantities of its lubricant or otherwise endanger the yieldable material to the destructive action of the lubricant.

Further objects of the invention are the provision of an intermediate layer of lubricant impervious material between the bearing element and a yieldable mounting therefor; to provide an intermediate layer of this character which readily bonds to rubber during vulcanization thereof, to provide an intermediate layer of this kind which may also be substantially integrally bonded to the metal of the bearing element in lubricant sealing relationship with respect thereto.

An illustrative embodiment of the invention is shown in the accompanying drawing, in which.

Figure 1:
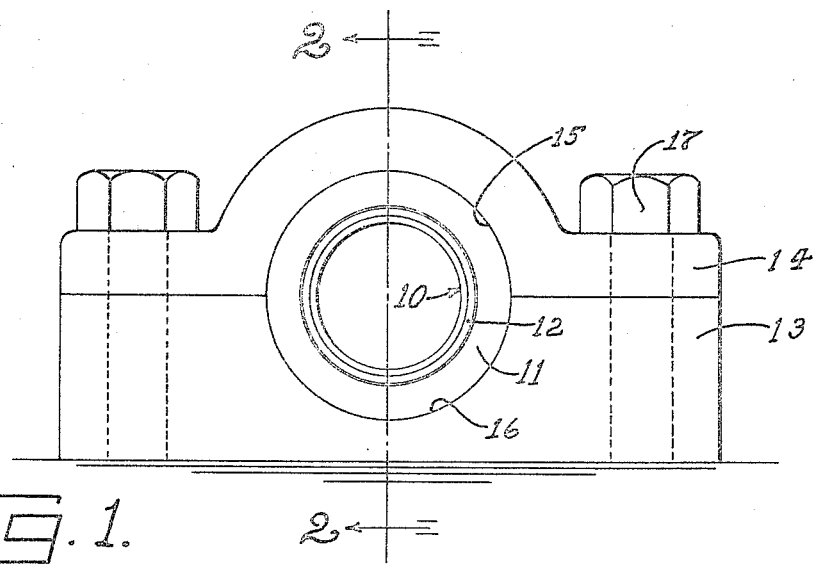
Fig. 1 is an end elevational view of a bearing yieldably mounted in accordance with the invention.
Figure 2:
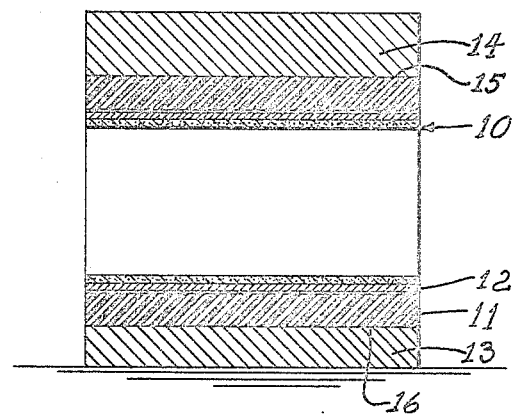
Fig. 2 is a transverse vertical sectional view taken on the line 2—2 of Fig. 1.

In the form of the invention illustrated in the drawing, a porous metal bearing element 10 of cylindrical shape is surrounded by a yieldable sleeve 11 preferably comprising rubber. Interposed between the sleeve 11 and the bearing element 10 is an intermediate sleeve 12, preferably comprising sheet metal, such as sheet steel or sheet brass. The bearing element 10, rubber sleeve 11 and intermediate sleeve 12 are preferably substantially integrally bonded together to present a unitary bearing structure which is receivable between the bearing block 13 and bearing cap 14, shown in Fig. 1, and provided with complementary bearing recesses 15 and 16, respectively, for accommodating the bearing unit. The bearing block and cap may be detachably secured together by bolts 17 or in any other suitable way.

The bearing sleeve 10 preferably comprises a compressed and sintered mass of powdered metal particles and has a large degree of porosity. Suitable porous bearing material may be formed by thoroughly mixing together substantially the following:

|  | Per cent by weight |
|---|---|
| Powdered copper | 88.5 |
| Powdered tin | 10. |
| Powdered graphite | 1.5 |

This mixture may contain solid lubricant, such as boric acid or salicylic acid, in amounts of substantially 1% by weight, in order to lubricate the particles of powdered metal during compression thereof to briquette form and to provide additional voids in the resulting structure.

The foregoing mixture is compressed into a briquette of a desired shape and then sintered in a reducing or non-oxidizing atmosphere at a temperature above the melting point of tin and below the melting point of copper. The resulting product may be immersed in oil before cooling in order to impregnate it with a lubricant charge, or its voids may be filled with oil at a later stage in the manufacture of the bearing member. Various other compositions of powdered metals may be employed in place of the powdered copper and tin composition set forth above.

In the form of the invention illustrated in the drawing, a journal type of bushing is disclosed. Other types of bearing members may also be constructed in accordance with the invention, the disclosure of the journal type of bearing being set forth as an illustration.

The bearing element 10 or any bearing element of a desired shape may be formed by compressing the mixture of powdered metals between rolls and then sintering the resulting sheet-like briquette. Regardless of the manner in which the porous metal bearing element is constructed, it is preferably provided on the surface thereof opposite from its operative sleeve bearing surface, with a layer of oil impervious material, such as the sheet metal sleeve 12. The intermediate layer of oil impervious metal may be integrally bonded to the surface of the metal with which it is contacted by heating the assembly in a reducing atmosphere at a temperature sufficiently high to fuse the metal of lower melting point to the metal of the intermediate layer. This may be done in a conventional hydrogen welding process where, as in the above composition, a substantial amount of copper is present.

The bearing 10 and intermediate oil impervious layer 12 may be soldered or brazed together by providing a film of suitable soldering or brazing material therebetween. If the bearing element has not been impregnated with oil prior to this step, the assembly is then heated slightly and immersed in an oil bath and allowed to remain therein until substantially all of the voids of the porous metal have been filled with lubricant.

If the intermediate layer or sleeve 12 of oil impervious material comprises brass, it may be directly bonded by vulcanization to the rubber sleeve 11 or other yieldable rubber support to which it is desired to secure the bearing element. If the intermediate layer 12 comprises sheet steel, the external surface thereof may be brass plated in order to present a surface which readily bonds to rubber during vulcanization of the latter.

In a bearing of the foregoing character, the porous metal bearing 10 releases sufficient oil to lubricate its surface without permitting the flow of excessive amounts of oil onto the adjacent rubber parts of the mounting. The intermediate layer 12 provides an effective seal between the oil containing bearing element 10 and the rubber surface to prevent the exposure of this rubber surface to the detrimental action of the lubricant. All of these advantages may be obtained in bearings of flat or other shape.

Synthetic rubber, such as polymerized chloroprene, commercially known as "Duprene" and "Neoprene" may be used in place of rubber as the yieldable element in bearings embodying the invention and such compounds, as well as rubber compounds, may be cemented or bonded by vulcanization to the oil impervious layer.

Although but one specific embodiment of the invention is herein shown and described, it will be understood that various changes in the size, shape and arrangement of parts may be made without departing from the spirit of my invention.

What I claim is:

1. A bearing member including a porous metal journal portion having a substantial absorbed liquid lubricant content, a yieldable sleeve comprising non-metallic material surrounding said journal portion, and an intermediate sleeve comprising lubricant impervious material between said journal portion and said yieldable sleeve.

2. A bearing member including a porous metal journal portion having a substantial absorbed liquid lubricant content, a yieldable sleeve comprising rubber surrounding said journal portion, and a lubricant impervious intermediate sleeve between said yieldable sleeve and said journal portion comprising metal and having its inner and outer surfaces substantially integrally bonded to the outer and inner surfaces of said journal portion and yieldable sleeve respectively.

3. A bearing member including a porous metal bearing element having an exposed bearing surface and having a substantial absorbed liquid lubricant content, a layer of lubricant impervious metal substantially integrally bonded to another surface of said bearing element, and means for yieldably supporting said bearing element comprising a layer of yieldable material bonded to said layer of lubricant impervious metal.

4. A bearing member including a porous metal bearing element having an exposed bearing surface and having a substantial absorbed liquid lubricant content, a layer of sheet metal to which rubber readily bonds during vulcanization thereof, substantially integrally bonded to another surface of said bearing element in lubricant sealing relationship with respect thereto, and means for yieldably supporting said bearing element comprising a layer of rubber composition adjacent said sheet metal layer and having a vulcanized bond thereto.

JOHN V. HENDRICK.